United States Patent [19]

Durand

[11] 4,133,940
[45] Jan. 9, 1979

[54] ELECTROCHEMICAL GENERATORS HAVING TWO SEDIMENTATION-BED CHAMBERS FED IN SERIES WITH AN ELECTROLYTE WHICH CONTAINS PARTICLES

[75] Inventor: Pierre Durand, Clermont-Ferrand, France

[73] Assignee: Compagnie Generale des Etablissements Michelin, Clermont-Ferrand, France

[21] Appl. No.: 821,761

[22] Filed: Aug. 4, 1977

[30] Foreign Application Priority Data

Aug. 8, 1976 [FR] France .................... 76 24467
Jul. 19, 1977 [FR] France .................... 76 22331

[51] Int. Cl.$^2$ ............................ H01M 8/04
[52] U.S. Cl. ........................ 429/12; 429/15
[58] Field of Search ............. 429/12, 13, 14, 15, 429/27

[56] References Cited

U.S. PATENT DOCUMENTS 409,366  8/1889  Mond et al. .................... 429/14
4,038,458  7/1977  Jacquelin .................... 429/15

Primary Examiner—Anthony Skapars
Attorney, Agent, or Firm—Brumbaugh, Graves, Donohue & Raymond

[57] ABSTRACT

Electric current is produced in an electrochemical generator having two chambers at different levels. The process involves creating a flow of a liquid electrolyte within the two chambers in series. The liquid electrolyte contains active solid particles or solid particles transporting an active material, the density of the particles is greater than that of the electrolyte, and the surface of the inner face of at least one chamber is formed by the electrolyte-side surface of an electron collector. The particles form in each chamber a sedimentation bed contiguous to the lower face of said chamber and entrained by the electrolyte. The flow passes from one chamber to the other through a conduit in such a manner that the flow lines in the vicinity of each of the edges which respectively define the upper and lower openings of the conduit are oriented substantially at right angles to the edges.

33 Claims, 17 Drawing Figures

ELECTROCHEMICAL GENERATORS HAVING TWO SEDIMENTATION-BED CHAMBERS FED IN SERIES WITH AN ELECTROLYTE WHICH CONTAINS PARTICLES

BACKGROUND OF THE INVENTION

This invention relates to electrochemistry and, more particularly, to novel and highly-effective processes for producing electric current utilizing electrochemical reactions and to generators for use in such processes.

Such generators comprise at least one cell having at least one anode compartment and one cathode compartment.

The invention concerns, in particular, generators of this type which comprise a compartment containing a liquid electrolyte within which particles are contained, the electrolyte and the particles being in movement. This compartment comprises a so-called "electron-collector" member which is a conductor of electricity and is intended to collect the electric charges liberated during the electrochemical reaction carried out in the compartment or to deliver the electric charges necessary for this reaction.

The expression "particles" is employed in a very broad sense and designates solid particles, liquid or pasty drops, or gas bubbles, the drops or bubbles forming, for instance, liquid or gaseous emulsions in the electrolyte, or mixtures of any of these.

The particles may furthermore be formed in their entirety of a material which participates in the electrochemical reaction, i.e. so-called "active material".

The particles may on the other hand be partially active and/or serve as support for at least one active material. This is true in particular both of particles containing this active material in the state of a solution, alloy, or amalgam and of particles whose electrochemically inactive center, which is for instance solid, is covered by such active material, the particulate supports then permitting the transport of the active material and possibly serving as catalysts.

In all cases, the active material may be present in any physical state—solid, liquid, or gaseous—, and its chemical composition may be any whatsoever, for instance a metal, oxygen, hydrogen, a halogen, or an inorganic or organic compound, in particular an oxide, a salt, a hydrocarbon, an alcohol, an acid, an amine, or a mixture of these active materials.

The electrochemical reaction in which the active material participates may take place in anode compartments, the active material being then sometimes referred to as "fuel", or in cathode compartments.

The invention concerns more particularly generators in which there is created, through at least one of the compartments, a flow of a liquid electrolyte containing particles in accordance with the preceding definition which are in intermittent contact with the collector so as to favor the diffusion of the active material or of the products resulting from the electrochemical reaction. In order to increase the specific power of these generators, U.S. patent application Ser. No. 821,760, now U.S. Pat. No. 4,092,461, filed concurrently herewith, entitled "Electrochemical Generators with a Sedimentation Bed", discloses creating in the compartment a flow such that the particles, whose density is greater than that of the electrolyte, are solid and form a sedimentation bed contiguous to the lower face of the compartment, the surface of the lower face being formed at least in part by all or part of the surface of an electron collector arranged on the electrolyte side.

The particles which thus, because of their weight, become concentrated in the vicinity of the lower face of the compartment within a space known as the "sedimentation bed" are entrained by the electrolyte.

The movements of the particles within the sedimentation bed assure a substantial current density while facilitating the diffusion phenomena. For this purpose, it may be advantageous to provide the lower face with elements in relief arranged above a base surface, said base surface being possibly at least in part immaterial. In the following, the expression "lower face" of the compartment designates either the actual surface of the face (when it does not have any elements in relief) or its base surface (when it does have elements in relief), the expression "surface" of the lower face designating its actual surface.

In order suitably to form such a sedimentation bed, it is disclosed in that application that any normal to the lower face of the compartment, which normal is oriented towards the electrolyte, forms a small or zero angle, and in any event an angle of less than 90°, with the ascendant vertical.

In order to facilitate the formation of the sedimentation bed, the side faces may, in the vicinity of the inlet of the compartment, form an angle which diverges in the direction of flow, which angle is preferably equal to at most 20°. In order to facilitate the entrainment of this bed through the compartment, the upper and lower faces of the compartment can form an angle with converges in the direction of flow, which angle is preferably equal to at most 10°.

For the same purpose, the side faces of the compartment may, in the vicinity of the outlet of the compartment, form an angle which converges in the direction of the flow, this convergent angle being preferably equal to at most 20°.

When the formation of the sedimentation bed in the vicinity of the inlet to the compartment can be obtained without divergence in the compartment, it may possibly be advantageous to have the side faces converge over the greater part of the compartment or over the entire compartment.

The principal parameters involved in the formation of the sedimentation bed are as follows:

$d_0$ = density of the particles
$d_1$ = density of the electrolyte
$D$ = average diameter of the particles in the electrolyte
$u$ = average speed of flow in the compartment, that is to say the ratio:

$$\frac{\text{total volumetric flow of particles and electrolyte}}{\text{average cross section of the flow vein}},$$

this average cross section being measured perpendicular to the average direction of flow in the compartment and at a point located substantially at the center of the compartment $\mu$ = viscosity of the electrolyte
$e$ = average distance between the lower and upper faces of the compartment
$L$ = average length of the compartment
$l$ = average width of the compartment
$e$, $L$, $l$ being measured at a point located substantially at the center of the compartment, the measurement being made perpendicular to the lower face in the case of $e$, parallel to the average direction of flow in the compartment in the case of L, and perpendicular to that direction in the case of l R = Reynolds number = $2 d_1 e u/\mu$ v/V = ratio between the total volume v of the particles and the total volume V of electrolyte in the compartment at any given moment.

Preferably, $d_0$ is at least equal to 2.5; $d_1$ is at most equal to 1.6; D is at least equal to 30 microns; u is between 5 m/minute and 60 m/minute; e is at most equal to 1 cm; the ratio l/e is at least equal to 10; L is between 10 cm and 1 m and varies in the same direction as the ratio $$\frac{e^a u^b \mu^c}{(d_0 - d_1)^d D^{2f}},$$

in which a, b, c, d and 2f are positive exponents; R is at most equal to 4,000; v/V is at most equal to 0.30; $\mu$ is at most equal to 0.01 poiseville.

Even more preferably, $d_0$ is at least equal to 4; $d_1$ is at most equal to 1.4; D is at least equal to 40 microns; u is between 10 m/minute and 30 m/minute; e is between 1 mm and 5 mm; l/e is at least equal to 20; L is between 20 cm and 60 cm; R is at most equal to 3,000; v/V is at most equal to 0.15; and $\mu$ is at most equal to 0.005 poiseville.

It may be necessary to connect in series at least two sedimentation bed chambers. One of these chambers is an electrochemical compartment, previously defined, referred to as the "sedimentation bed" compartment, and the other may be either another electrochemical compartment or a chamber without electron collector, and in particular a feed chamber.

When this series connection is effected without any particular precaution there is a disturbance in the sedimentation bed in the downstream chamber and it is necessary to reconstitute the sedimentation bed in an additional device before introducing the electrolyte and the particles into the chamber. This device, for instance one of the devices described in U.S. patent application Ser. No. 821,759, filed concurrently herewith, entitled "Electrochemical Generators with a Sedimentation Bed and Divergent Feed", increases the size and the price of the generator.

The difficulty in connecting chambers in such a manner that they are traversed in series by a liquid electrolyte containing particles is moreover present even if there is no sedimentation of the particles in the chambers and even if the particles are not solid, since the disturbance in the flow generally are transmitted from one chamber to the other.

SUMMARY OF THE INVENTION

An object of the present invention is to avoid the problems outlined above in a method of producing electric current utilizing electrochemical reactions in a generator. These and other objects are attained by providing a generator comprising at least two chambers, each of the two chambers having two main faces, and by creating, through the two chambers, a flow in series of a liquid electrolyte containing at least partially-active particles and/or particles transporting at least one active material, at least one of the two chambers comprising at least one electron collector. The method is characterized in that the flow passes from the upstream chamber to the downstream chamber through a connecting conduit, the two openings of which open on the closest main faces of the two chambers, each opening being limited by an edge of the adjacent main face in such a manner that the streamlines of the flow in the vicinity of each of the edges are oriented substantially at right angles to the respective edges.

By "streamline" there is understood a curve tangent at each of its points to the respective velocity vectors at such points.

The objects of the invention are attained also by novel electrochemical generators for use in such a process.

BRIEF DESCRIPTION OF THE DRAWINGS

A better understanding of the invention may be gained from a consideration of the following detailed description of the preferred embodiments of the invention in conjunction with the appended drawings, wherein.

DESCRIPTION OF THE PREFERRED EMBODIMENTS

Figure 1:
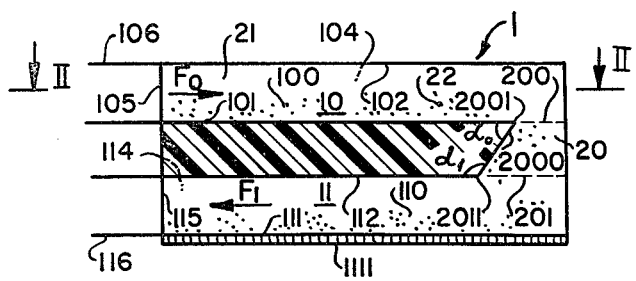
FIG. 1 is a diagrammatic view of a generator in accordance with the invention having upper and lower chambers, the view being in section along the line I—I of FIG. 2 and in a vertical plane parallel to the average direction of flow in the two chambers.
Figure 12:
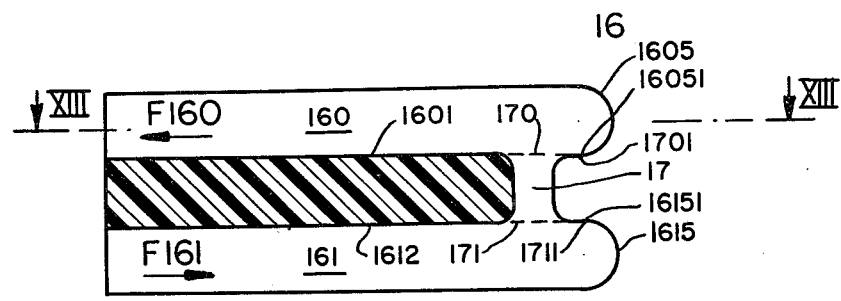
FIG. 12 is a diagrammatic view of another generator in accordance with the invention having two chambers, the view being in section along the line XII—XII of FIG. 13 and in a vertical plane parallel to the average direction of flow in the two chambers.
Figure 13:
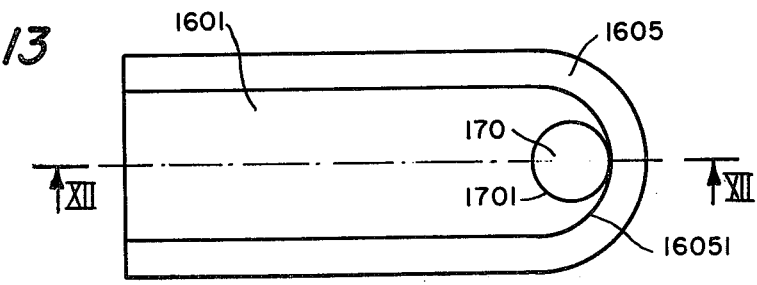
FIG. 13 is a diagrammatic view, seen from above, of the generator shown in FIG. 12, the view being in section along the line XIII—XIII of FIG. 12 and in a plane parallel to the lower face of the upper chamber.
Figure 14:
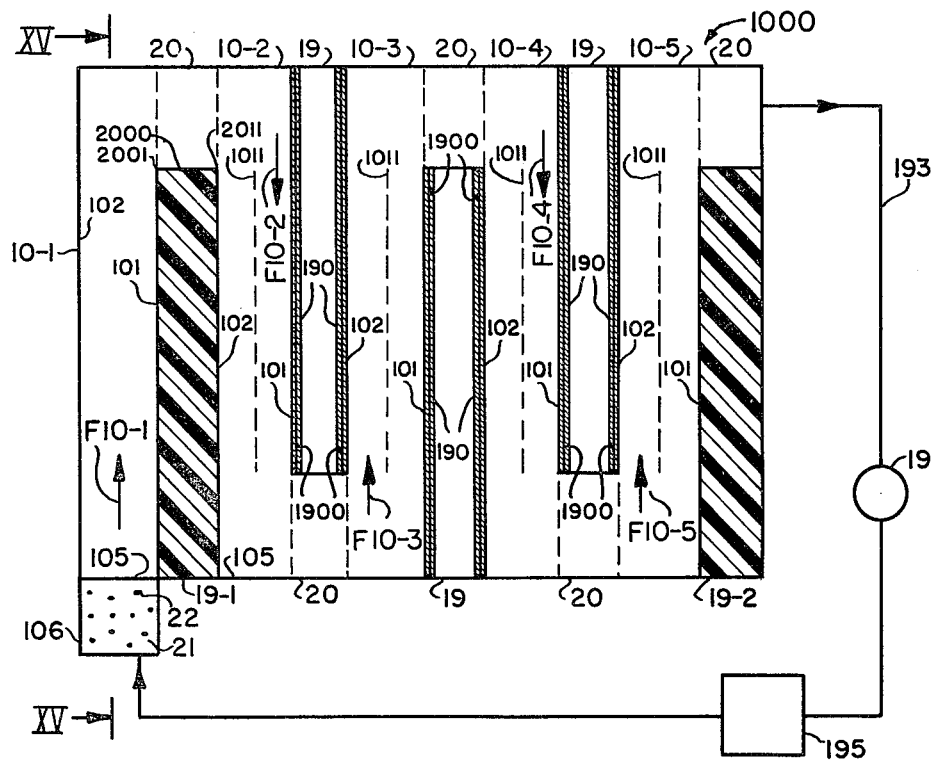
FIG. 14 is a diagrammatic view of another generator in accordance with the invention comprising five chambers, the view being in section along the line XIV—XIV of FIG. 15 and in a plane perpendicular to the main faces of these chambers and parallel to the average direction of flow in the chambers.

For clarity of the drawing, the particles have been shown only in parts of FIGS. 1 and 14; they have not been shown at all in the other figures, and only the connecting conduits and the generator chambers in accordance with the invention have been shown in FIGS. 3-7, 12 and 13.

The generator in accordance with the invention shown in FIG. 1 has two chambers 10 and 11 which are superimposed and connected in series, the chamber 10 which is located at the higher level being called the upper chamber and the other chamber 11 being called the lower chamber. The upper chamber 10 has a lower face 101 and an upper face 102. The lower chamber 11, referred to as the compartment, has a lower face 111 formed by the upper surface of an electron collector 1111 and an upper face 112. The lower faces 101 and 111 and the upper faces 102 and 112 are substantially flat and horizontal. The chambers 10 and 11 are connected by a connecting conduit 20. The upper opening 200 of the conduit 20 debouches onto the lower face 101 of the upper chamber 10; the lower opening 201 of the conduit 20 debouches onto the upper face 112 of the lower chamber 11. The upper opening 200 is limited on the side of the adjacent lower face 101 by a linear upper edge 2001 which is integral with the face 101. The lower opening 201 is limited on the side of the adjacent upper face 112 by a linear lower edge 2011 which is integral with the face 112. The lower chamber 11 has two side faces 113 and 114 which are flat, parallel, and perpendicular to the lower face 111. The upper chamber 10 similarly has two side faces 103 and 104 which are flat, parallel, and perpendicular to the lower face 101. The side faces 113 and 114 are connected to the upper face 112 by the side connecting lines 1130 and 1140, the lower edge 2011 being perpendicular to the side connecting lines 1130 and 1140. Likewise, the side faces 103 and 104 are connected to the lower face 101 by side connecting lines 1030 and 1040, the upper edge 2001 being perpendicular to the side connecting lines 1030 and 1040. The flat face 2000 connecting the edges 2001 and 2011 forms supplementary angles $\alpha_0$ and $\alpha_1$ with the faces 101 and 112 adjacent to these edges.

A feed device 106 connected to the opening 105 of the upper chamber 10, which opening is located at the end of the chamber 10 opposite the end where the upper opening 200 of the conduit 20 is located, makes it possible to introduce into chamber 10, called the upstream chamber, an electrolyte 21 containing solid particles 22 whose density is greater than that of the electrolyte 21. The particles 22 form within the upstream chamber 10 a sedimentation bed 100 which is contiguous to the surface of the lower face 101 and is entrained by the electrolyte 21, the average direction of the flow of the electrolyte 21 and of the particles 22 being oriented in the direction indicated by the arrow $F_o$ parallel to the lower face 101 and the side faces 103 and 104.

The electrolyte 21 and the particles 22 thus flow from the upstream chamber 10 towards the downstream chamber 11 through the connecting conduit 20. The arrow F10 represents the direction of a streamline in the vicinity of the upper edge 2001. The direction F10 is substantially perpendicular to the upper edge 2001. In similar manner, the dashed-line arrow F11 indicates the orientation of a streamline in the vicinity of the lower edge 2011, the direction F11 being substantially perpendicular to the lower edge 2011.

From the conduit 20, the electrolyte 21 containing the particles 22 then flows into the downstream chamber 11, the average direction of flow being oriented in the direction indicated by the arrow F1, opposite the direction of the arrow $F_o$, the particles 20 again forming a relatively undisturbed sedimentation bed 110 contiguous to the surface of the lower face 111. The electrolyte 21 and the particles 22 which have not been consumed during their passage through the compartment 11 as a result of the electrochemical reaction are evacuated from the compartment 11 via an evacuation conduit 116 connected to the opening 115 of the compartment 11, the opening 115 being located at the end of the compartment 11 which is opposite the end where the lower opening 201 of the conduit 20 is located. The angles $\alpha_0$ and $\alpha_1$ are preferably between 70 and 110°, and even more preferably are equal to 90°; excessively low or excessively large values cause disturbances in the sedimentation bed 110 formed in the downstream chamber 11. For clarity of the drawing, the particles 22 have been shown only in the chambers 10 and 11 and in the conduit 20 in FIG. 1.

Figure 3:
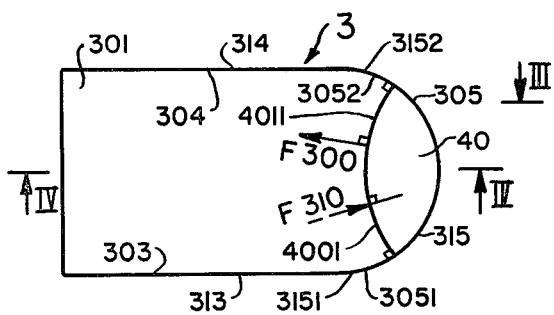
FIG. 3 is a diagrammatic view, seen from above, of another generator in accordance with the invention comprising upper and lower chambers, the view being in section along the line III—III of FIG. 4 and in a plane parallel to the lower force of the upper chamber.
Figure 4:
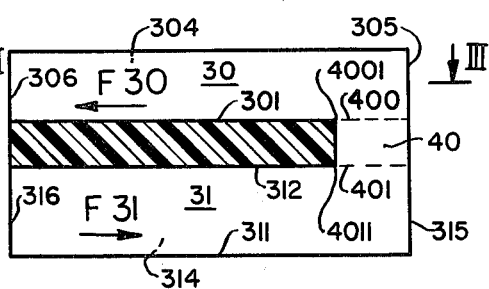
FIG. 4 is a diagrammtic view of the generator shown in FIG. 3, the view being in section along the line IV—IV of FIG. 3 and in a vertical plane parallel to the average direction of flow in the two chambers.

FIGS. 3 and 4 show another generator 3 in accordance with the invention. This generator has two superimposed chambers 30 and 31, the lower chamber 31 being the upstream chamber. The upper chamber 30 has two side faces 303 and 304 which are substantially vertical and connected by a vertical end face 305 formed by a portion of a cylinder of revolution.

In similar manner, the lower chamber 31 has two substantially vertical side faces 313 and 314 connected by a vertical end face 315 formed by a portion of a cylinder of revolution. The upstream chamber 31 is connected to the downstream chamber 30 by a vertical conduit 40 whose upper opening 400 debouches onto the flat horizontal lower face 301 of the upper chamber 30, the upper opening 400 being limited on the side of the lower face 301 by an upper edge 4001 having the shape of a circular arc perpendicular to the end connecting lines 3051 and 3052 corresponding to the connection of the end face 305 with the lower face 301 of the upper chamber 30. In a similar manner, the lower opening 401 of the conduit 40 debouches onto the flat, horizontal upper face 312 of the lower chamber 31, the opening 401 being limited on the side of the upper face 312 by a lower edge 4011 having the shape of a circular arc perpendicular to the end connecting lines 3151 and 3152 corresponding to the connections of the end face 315 with the upper face 312 of the lower chamber 31. The electrolyte and the particles (not shown) are introduced into the generator 3 via a feed conduit (not shown) debouching onto the opening 316 of the lower chamber 31. The electrolyte and the particles which have not been consumed are evacuated from the generator 3 via an evacuation conduit (not shown) which debouches onto the opening 306 of the upper chamber 30. The openings 316 and 306 are similar in structure and function to the openings 115 and 105 of the chambers 11 and 10 shown in FIGS. 1 and 2.

Figure 5:
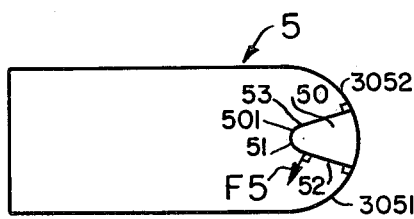
FIG. 5 is a diagrammatic view, seen from above, of another generator in accordance with the invention comprising upper and lower chambers, the view being in section along a plane parallel to the lower face of the upper chamber.
Figure 6:
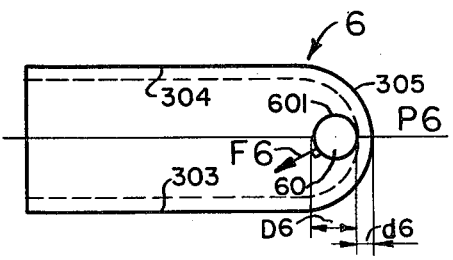
FIG. 6 is a diagrammatic view, seen from above, of another generator in accordance with the invention comprising upper and lower chambers, in section along a plane parallel to the lower face of the upper chamber.

As a result of this arrangement, all the orientations F 300 of the streamlines in the vicinity of the upper edge 4001 are perpendicular to the edge 4001 and all the orientations F 310 of the streamlines in the vicinity of the lower edge 4011 are perpendicular at any point to the edge 4011. There is thus obtained a flow of the electrolyte and particles (not shown) in the two chambers in series, the average directions of flow in the chambers 31 and 30 being oriented in the opposite directions of the horizontal arrows F31 and F30, parallel to the faces 303, 304, 313, 314, the particles forming in each chamber a sedimentation bed contiguous to the surface of the lower face of the chamber. One of the chambers may have an electron collector and be a compartment as defined above. Both chambers may also be compartments. FIGS. 5 and 6 show two different generators 5 and 6 in accordance with the invention, which are similar to the generator 3 previously described but in which the connection conduit 40 is replaced by two other vertical connecting conduits 50 and 60, respectively. For simplicity in description, only the upper chambers of these generators 5 and 6 have been shown, the lower edges of the conduits 50 and 60 being similar to the corresponding upper edges.

Figure 7:
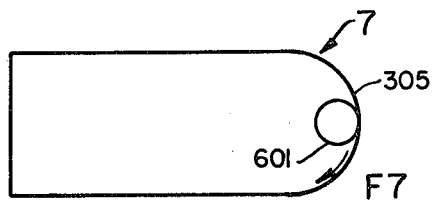
FIG. 7 is a diagrammatic view, seen from above, of a generator comprising upper and lower chambers, in section along a plane parallel to the lower face of the upper chamber (in this generator, which is not fully in accordance with the invention, the flow lines in the vicinity of the edges of the conduit joining the two chambers are not oriented at right angles to these edges)

The upper edge 501 of the connecting conduit 50 of the generator 5 is formed of a portion of a circle 51 extended by two linear lines 52 and 53 perpendicular to the extreme edges 3051 and 3052, respectively. All the orientations F5 of the streamlines in the vicinity of the upper edge 501 are perpendicular to the edge. The upper edges 601 of the connecting conduit 60 of the generator 6 is a circle spaced from the side faces 303, 304 and from the end face 305. All the orientations F6 of the streamlines in the vicinity of the upper edge 601 are perpendicular to the edge. The upper edge 601 of the connecting conduit 60 is located in the vicinity of the end face 305 in order to avoid stagnation of the electrolyte and of the particles between the edge and the face. However, it is important that the upper edge 601 not be tangent to the end face 305. As FIG. 7 shows, in case of such a tangent relation, the streamlines F7 in the vicinity of the end face 305, would then have orientations which are no longer perpendicular to the upper edge 601. From this there follows a disturbance in the sedimentation bed of the downstream chamber 30.

The distance d6 separating the upper edge 601 from the end face 305 is, for these reasons, preferably between D6/20 and D6/2, , D6 being the diameter of the upper edge 601.

However, when the end face located in the vicinity of the circular edge has a concavity which faces the electrolyte, the edge can possibly be arranged in such a manner that it is tangent to the end connecting line of said end face. Such a generator 16 in accordance with the invention is shown in FIGS. 12 and 13.

The arrangement of this generator is similar to that of the generator 6, with the difference that the end face 1605 of the upper chamber 160 and the end face 1615 of the lower chamber 161 have a semi-toroidal shape, the concavity facing the electrolyte. The connecting conduit 17 has an upper opening 170 formed of a rounding which connects tangentially with the lower face 1601 of the upper chamber 160 along the upper circular edge 1701 which is tangent to the semicircle 16051 corresponding to the tangential connection of the end face 1605 with the lower face 1601, the semicircle 16051 being the end connecting line. The lower part of the connecting conduit 17 has a similar shape, that is to say the lower circular edge 1711 is tangent to the end connecting line 16151 which is a half circle, the edge 1711 and the line 16151 being merged with the upper face 1612 of the lower chamber 161. This arrangement permits a perpendicular orientation of the streamlines (not shown) with the adjacent edges in a manner similar to that shown in FIG. 6, since the spaces corresponding to the concavities permit the distribution of the electrolyte containing the particles around the openings 170 and 171 of the connecting conduit 17.

Each of the generators 1, 3, 5, 6, and 16 preferably has a vertical plane of symmetry parallel to the average direction of flow in the chambers. FIG. 6 shows such a plane of symmetry P6. The direction of flow of the electrolyte and of the particles in the generators shown in FIGS. 1 to 6, 12 and 13 can be reversed, the flow then taking place from the bottom to the top in the generator 1, and from the top to the bottom in the generators 3, 5, 6 and 16, the upstream chambers thus becoming downstream chambers without the other characteristics of the flow being substantially modified. This surprising character, obtained as a result of the invention, permits great flexibility in the placing in series of the chambers.

Figure 8:
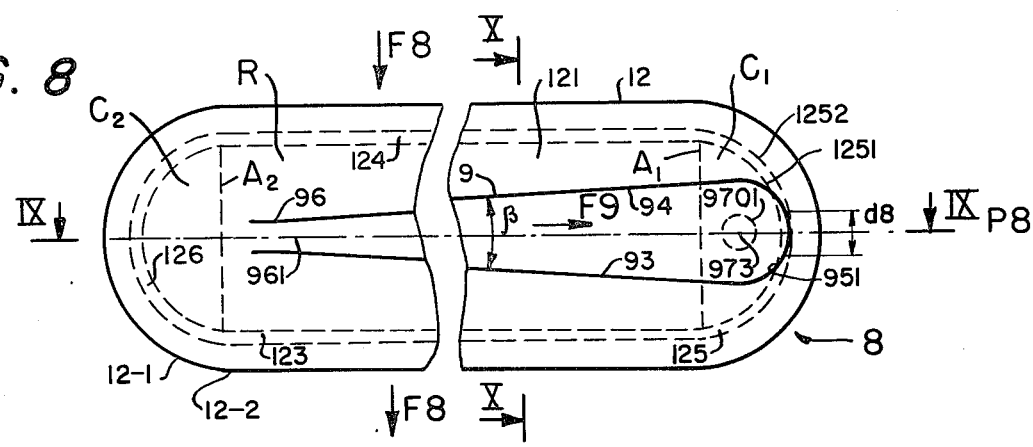
FIG. 8 is a diagrammatic view, seen from above, of another generator in accordance with the invention, comprising three chambers.
Figure 9:
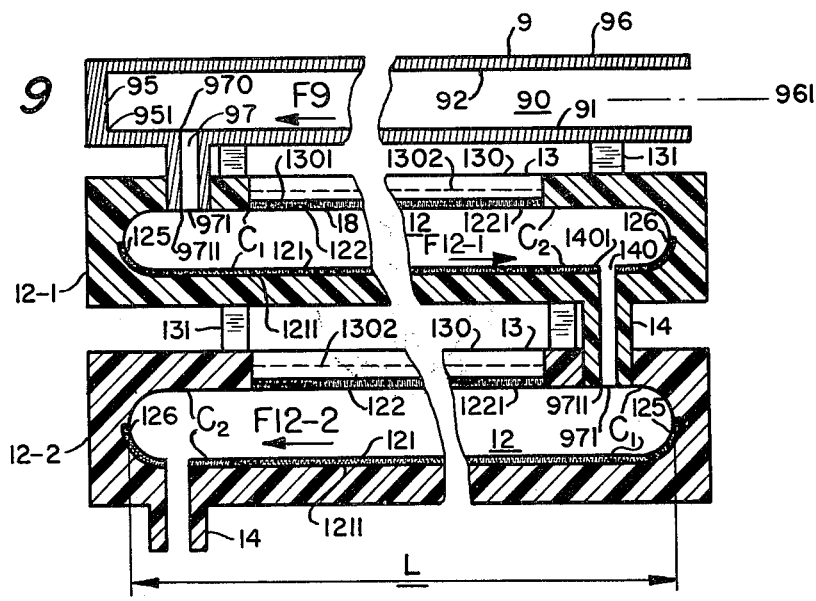
FIG. 9 is a diagrammatic view of the generator shown in FIG. 8, the view being in section along the line IX—IX of FIG. 8 and in a vertical plane parallel to the average direction of flow in the three chambers.
Figure 10:
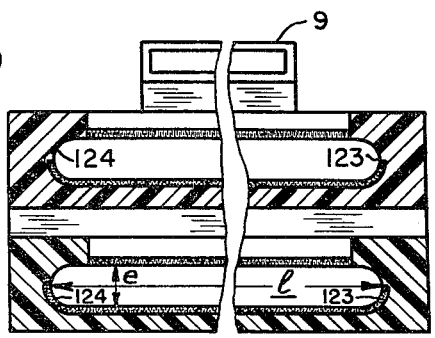
FIG. 10 is a diagrammatic view of the generator shown in FIGS. 8 and 9, the view being in section along the line X—X of FIG. 8 and in a vertical plane perpendicular to the average direction of flow in the three chambers.

FIGS. 8 to 10 show embodiment of a generator 8 in accordance with the invention. This generator comprises a feed device 9 and two cells 12-1 and 12-2 of similar construction, the assembly of the feed device 9 and of the cells 12-1 and 12-2 constituting a module. show another The feed device 9, called the module feed device, comprises a chamber 90 having a lower face 91, an upper face 92, and two opposite side faces 93 and 94.

The lower face 91 and upper face 92 are flat, parallel, and horizontal. The opposite side faces 93 and 94 are flat and vertical and form with each other an angle $\beta$, which is preferably at most equal to 20°, diverging in the direction of the average direction of flow in the chamber 90, said direction being indicated by the arrow F9.

The side faces 93 and 94 are connected, at the place where they are farthest away from each other, by an end face 95, formed by a portion of a vertical cylinder, for instance a portion of a cylinder of revolution, the cross section of such portion of a cylinder along the face 91 being a curved line 951, which is thus an end connecting line.

The feed device 9 terminates at its narrow end opposite the cylinder portion 95 in a feed conduit 96 whose axis 961 is parallel to the average direction of flow F9. The feed device 9 has a cylindrical connecting conduit 97 whose vertical axis 973 is located in the vertical plane P8 parallel to the direction F9, which is a plane of symmetry for the device 9. The connecting conduit 97 has an upper opening 970 whose circular upper edge 9701 merges with the lower face 91 in the vicinity of, but spaced apart from, the curved line 951. Each of the similar cells 12-1 and 12-2 has a chamber 12 comprising a lower face 121 and an upper face 122, these faces being substantially flat, horizontal, and of identical shape, formed by a rectangle R extended on two opposite sides $A_1$ and $A_2$ by two semi-circular surfaces $C_1$ and $C_2$. The linear sides of these faces 121 and 122 are connected by two side faces 123, 124 in the form of half cylinders of revolution, and the curved edges of the semi-circular surfaces $C_1$ and $C_2$ of the faces 121 and 122 are connected by two end faces 125 and 126 of semi-toroidal shape, the concavities of these side and end surfaces being directed towards the chamber 12. The plane P8 is also a plane of symmetry for the cells 12-1 and 12-2, the plane P8 being perpendicular to the sides $A_1$ and $A_2$ of the rectangles R. The lower face 121 and the lower half of the side faces 123, 124 and of the end faces 125, 126 are formed by the surface of an electron collector 1211 positioned on the side of the chamber 12.

The lower opening 971 of the connecting conduit 97, which serves as feed conduit for the chamber 12 of the cell 12-1, is limited by a circular lower edge 9711 which merges with the upper face 122 of the cell 12-1 in the vicinity of the end face 125. As FIGS. 12 and 13 show, the circular edge 9711 can be tangent to the line 1251 connecting the end face 125 with the upper face 122.

The chamber 12 of the cell 12-1 comprises, in the vicinity of the end opposite the opening 971, a cylindrical evacuation conduit 14 with its vertical axis (not shown) located in the plane of symmetry P8. The circular edge 1401 limiting the upper opening 140 of the conduit 14 is merged with the lower face 121 in the vicinity of the end face 126, that is to say it has an arrangement similar to that of the edge 9711 with respect to the end face 125. The lower opening 971 of the evacuation conduit 14, which conduit serves as connecting conduit between the cells 12-1 and 12-2, has a shape and an arrangement identical to those of the lower opening 971 of the connecting conduit 97 and it is limited by a circular lower edge 9711 which is merged with the upper face 122 of the cell 12-2. The evacuation conduit 14 of the cell 12-2, arranged in a manner similar to the conduit 14 of the cell 12-1, serves as an evacuation conduit for the generator 8. This arrangement has the advantage of avoiding disturbance of the sedimentation bed located upstream of the conduit 14 in the chamber 12 of the cell 12-2.

In each cell 12-1 and 12-2, at least one part 1221 of the upper face 122, for instance the part corresponding to the rectangle R, is ionically connected with a compartment 13, which is electrochemically associated with the chamber 12, A liquid electrolyte (not shown) containing solid particles (not shown) of a density greater than that of the electrolyte is introduced into the feed conduit 96 of the feed device 9. The angle of divergence $\beta$, which is preferably at most equal to 20°, makes it possible progressively to increase the surface of the lower face 91 during the advance of the electrolyte and the particles in the chamber 9.

There is thus formed a sedimentation bed of particles which is contiguous to the surface of the lower face 91 and entrained by the electrolyte along the average direction indicated by the arrow F9 substantially horizontal and parallel to the plane of symmetry P8. The particles and the electrolyte then flow into the chamber 12 of the cell 12-1 via the connecting conduit 97 and then into the chamber 12 of the cell 12-2 via the connecting conduit 14 of the cell 12-1. The arrangement of the connecting conduits 97 and 14, which is similar to that of the connecting conduit 60 shown in FIG. 6, is such that any orientation of the streamlines (not shown) in the vicinity of the edges 9701 and 9711 of the connecting conduit 97, and in the vicinity of the edges 1401 and 9711 of the connecting conduit 14, is substantially perpendicular to the respective edges. This results in the formation of undisturbed sedimentation beds in the chambers 12 of the cells 12-1 and 12-2, these sedimentation beds (not shown) being entrained by the electrolyte along average directions represented by the arrows F 12-1 and F 12-2, respectively, which are substantially horizontal and parallel to the plane of symmetry P8.

The feed device 9 and the cells 12-1 and 12-2 preferably have a so-called head-tail arrangement, the average directions of flow represented by the arrows F 9, F 12-1, and F12-2 being alternately in opposite directions, as shown in FIG. 9. the curvature of the end connecting line 951 is preferably substantially identical with the curvature of the larger horizontal half-circle 1252 of the end face 125 of the cell 12-1 over a chord whose length $d_8$ is at least equal to twice the inside diameter $D_8$ of the conduit 97, and the axis 973 of the conduit 97 is located substantially at the same distance from the line 951 and the semi-circle 1252. If the connecting conduit 97 does not have a circular insdie cross section, the value $D_8$ then corresponds to the average inside diameter of this conduit, that is to say the value $4S/P$, S being the area of the inner cross section of the conduit, measured perpendicular to the average direction of flow in the conduit, and P being the perimeter of the cross section. The flow can further be improved by providing the orifices of conduits 97 and 14 with roundings. These roundings are preferably connected tangentially with the adjacent faces, as in FIG. 12.

Figure 16:
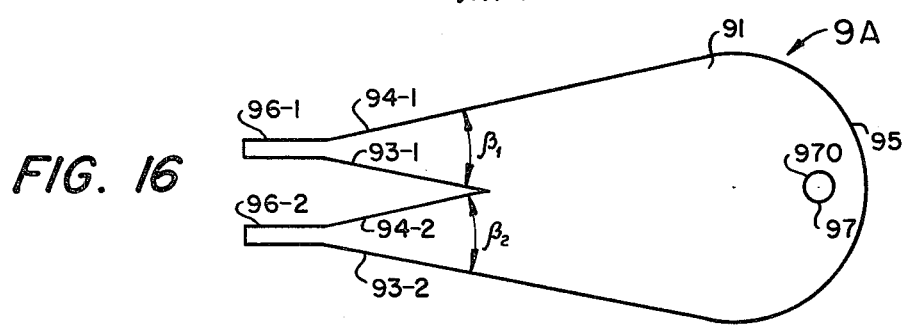
FIGS. 16 and 17 are diagrammatic views, seen from above, of an upstream chamber, used as feed device, of a generator in accordance with the invention, the view being in section along a plane parallel to the lower face of the chamber.

The distance between the lower face 91 and the upper face 92 of the feed device 9 may decrease in the direction of flow in the device 9, which makes it possible to increase the angle of divergence $\beta$ above 20° and therefore to decrease the size of the feed device. One can also, for instance, provide feed devices 9 which have several opposite side faces diverging in pairs and a plurality of feed conduits. FIG. 16, for instance, shows such a feed device 9A, having four opposite side faces in pairs 93-1, 94-1, 93-2, 94-2, these faces being for instance perpendicular to the lower face 91 of this device. The opposite faces 93-1, 94-1 form an angle $\beta 1$ with each other, and the opposite faces 93-2, 94-2 form an angle $\beta 2$ with each other, angles $\beta 1$, $\beta 2$, which are preferably equal, diverging towards the upper opening 970 of the connecting conduit 97. The feed conduit 96-1 connects to the pair of opposite faces 93-1, 94-1 at the place where they are closest together. Similarly, the feed conduit 96-2 connects with the pair of opposite faces 93-2, 94-2 at the place where they are closest together, The side faces 93-1 and 94-2 are connected together; the side faces 94-1 and 93-2 are connected at the place where they are furthest away by the end face 95. This arrangement is useful. for instance, when the generator may experience lateral inclinations during its operation.

Figure 17:
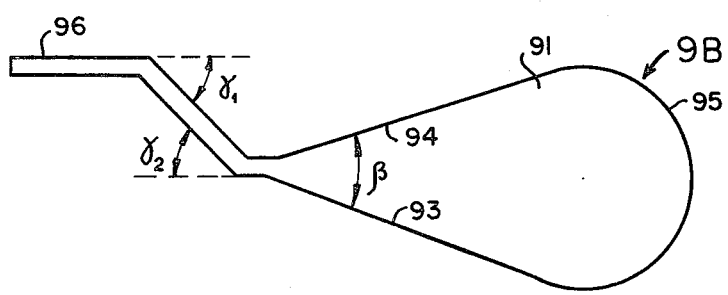

Moreover, the feed conduit 96 may have at least one elbow which causes a variation of flow in the conduit. FIG. 17 shows such a feed device 9B whose feed conduit 96, which connects to the side faces 93 and 94 at the place where they are closest together, these faces being for instance perpendicular to the lower face 91 of this device, has two elbows of angles $\gamma_1$ and $\gamma_2$, these angles corresponding to the changes in the average direction of flow in the conduit 96 at the place of these elbows. such an arrngment may make it possible to avoid the congesting of the generator in its central portion,. The angles $\gamma_1$ and $\gamma_2$, which are for instance equal, are preferably between 70° and 90°. They permit a homogeneous distribution of the particles in the electrolyte before the flow debouches into the divergent portion corresponding to the angle $\beta$. It goes without saying that this arrangment may be applied to each of the feed conduits if the feed device has several of them.

It is possible furthermore to provide feed conduits 96 whose axis is not parallel to the lower face of the feed device 9. All these embodiments are disclosed in the aforementioned U.S. applications.

Furthermore, the lower face 121 of at least one of the compartments 12 may be formed only in part by the surface of the corresponding collector 1211, and the side faces 123, 124 and the end faces 125, 126 may be made of materials other then the material or materials constituting the surface of the collectors.

It also goes without saying that the lower face 121 may be permeable to the electrolyte while being impermeable to the particles, so as to permit ionic communication between the corresponding compartmwent 12 and another compartment located below the face 121, for instance a compartment 13. In this case, if the collector is permeable to the particles it is necessary to associate it with a separator which is permeable to the electrolyte and impermeable to the particles.

Figure 11:
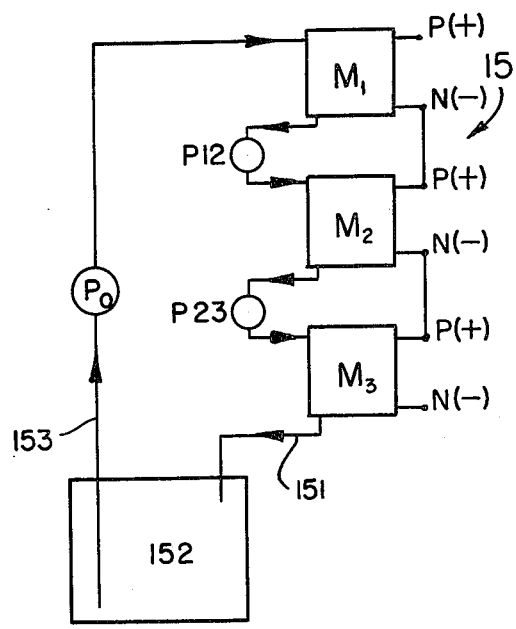
FIG. 11 is a diagrammatic view of another generator in accordance with the invention having 18 chambers.

In order still further to increase the power of the generator, several modules, each comprising several chambers in accordance with the invention, may be combined in parallel, or preferably in series. FIG. 11 shows, for instance, a generator 15 having three modules in series, numbered M1, M2, M3 from upstream to downstream. Each module comprises, in a manner similar to the generator 8 shown in FIGS. 8 to 10, the module feed device 9 (not shown) and 5 cells in series (not shown) whose structure is similar to that of the cells 12-1, 12-2, these cells and the device 9 being in "head-tail" arrangement.

The evacuation conduit 14 of the most downstream cell of the module M1 is connected to the conduit 96 of the feed device 9 of the module M2 via an intermediate pump P12.

Similarly, the evacuation conduit 14 of the furthest downstream cell of the module M2 is connected to the conduit 96 of the feed device 9 of the module M3 via an intermediate pump P23.

On the outside of the modules M1, M2, M3, between the evacuation conduit 14 of the furthest downstream cell of the module M3 and the conduit 96 of the feed device 9 of the module M1, a reservoir 152 of electrolyte and particles and a main pump $P_0$ permit the recycling of the electrolyte and particles into the generator by a conduit 151 which connects the furthest downstream cell of the module M3 with the reservoir 152 and by a conduit 153 which connects the reservoir 152 to the feed device 9 of the module M1 via the main pump $P_0$.

The arrangement of the chambers in accordance with the invention thus makes it possible to have a small loss of head in the entire generator 15, so that one can dispense with an intermediate pump between the module M3 and the reservoir 152, which would be impossible with other devices employing active particles in an electrolyte. The generator 15 is used, for instance, as generator of the metal/air type, the chambers 12 of the cells of the modules M1 to M3 being anode compartments in which there takes place the electrochemical oxidation of an anoidic active metal constituting part of all of the particles. The particles may for instance be zinc particles and the electrolyte may be an alkaline electrolyte. The surface of the collectors 1211 which is arranged on the electrolyte side is made for instance of a metallic material.

The part 1221 of the upper face 122 of each compartment 12 is formed by the lower face of a thin hydrophilic separator 18 which is permeable to the electrolyte and impermeable to the zinc particles. This separator 18 is applied to the flat face 1301, facing the compartment 12, of an air or oxygen diffusion cathode 130, arranged in the cathode compartment 13 which is electrochemically associated with the compartment 12. The circulation of air or oxygen for the feeding of the cathode compartments 13 represented by the arrows F8 (FIG. 8) takes place perpendicularly to the plane of symmetry P8 between the feed device 9 of each module and the furthest upstream cell of the corresponding module, as well as between two neighboring cells. Separating partitions 131, which are arranged perpendicular to the plane of symmetry between the feed device 9 of each module and the furthest upstream cell of the corresponding module and between two neighboring cells, assure the proper channeling of this air or oxygen and the rigidity of the assembly.

The operating conditions of the generator 15 may for instance be as follows:

electrolyte: 4 to 12 N potassium hydroxide solution (4 to 12 mols of potassium hydroxide per liter)

average size of the zinc particles introduced into the electrolyte: 10 to 20 microns percentage by weight of zinc in the electrolyte: 20% to 30% of the weight of the electrolyte, namely a ratio of v/V, previously defined, between about 0.04 and 0.06. This percentage is maintained practically constant by a feed device (not shown) which extends, for instance, into the resevoir 152.

average speed of flow in the anode compartment: 10 m/minute to 30 m/minute the distance between the lower face 121 and the upper face 122 of each compartment 12 is between 1 mm and 5 mm, for instance substantially equal to 2 mm the length L of each compartment 12 is between 20 cm and 60 cm the width 1 of each compartment 12 is between 5 cm and 15 cm, the ratio l/e being at least equal to 20 the length of the chamber 90 of the feed device 9, measured parallel to the average direction of flow in this device, is substantially equal to the length L of the compartment 12, the angle of divergence $\beta$ being between 10° and 15°.

Each cathode 130 is formed, for instance, in known manner essentially of carbon, silver, polytetrafluorethylene, and nickel, and it has a cathode collector 1302 which makes it possible to deliver into the cathode electrons necessary for the electrochemical reduction of the oxygen, the cathode active material.

The sedimentation is obained despite the fineness of the initial zinc paticles since these initial particles combine together, because of the basic electrolyte, predetermined form larger particles whose average diameter is generally greater than or equal to 50 microns, this phenomenon taking place in general whatever the origin of the initial particles.

During the test, the concentration of oxidized zinc dissolved in the form of potassium zincate in the electrolyte is maintained less than a predetemined value, equal for instance to about 120 g/l in the case of 6 N potassium hydroxide solution, so that the zinc particles are not made inactive by an accumulation of the reaction products on their surface or near their surface. This result can be obtained either by replacing the zincated electrolyte by a fresh solution of potassium hydroxide which is free of zincate when the concentration of dissolved zinc becomes excessive, or by continually regenerating the zincated electrolyte in apparatus not shown.

By way of example, in each module of the generator 15, the cathode 130 of the furthest upstream cell is electrically connected to a positive terminal P, the anode collector 1211 of each cell is electrically connected to the cathode 130 of the cell located immediately below it, and the anode collector 1211 of the furthest downstream cell is connected to a negative terminal N, these electric connections being effected therefore in series in this module. For clarity of the drawing, these electrical connections have not been shown. The terminals P and N of the modules M1, M2, M3 may be connected electrically in series, as shown in FIG. 11, the positive terminal P of the module M1 and the negative terminal N of the module M3 being the terminals of the generator 15. It goes without saying that the electrical connections in each module and/or between the modules may also be made in parallel.

One can thus obtain continuously with the generator 15 a power on the order of 750 watts for a current density equal substantially to 150 mA per $cm^2$ of the face 1301 of the air or oxygen diffusion electrode 130.

the cathode 130 has been described as an air or oxygen diffusion electrode, but it is obvious that other types of cathode can be used, for instance a cathode comprising at least one compound of oxygen, for instance a metallic oxide, and especially a silver oxide.

In all the preceding generators, the upper and lower faces of each chamber are the main faces of the chamber, that is to say their surfaces are larger than those of the other faces of the chamber.

Figure 15:
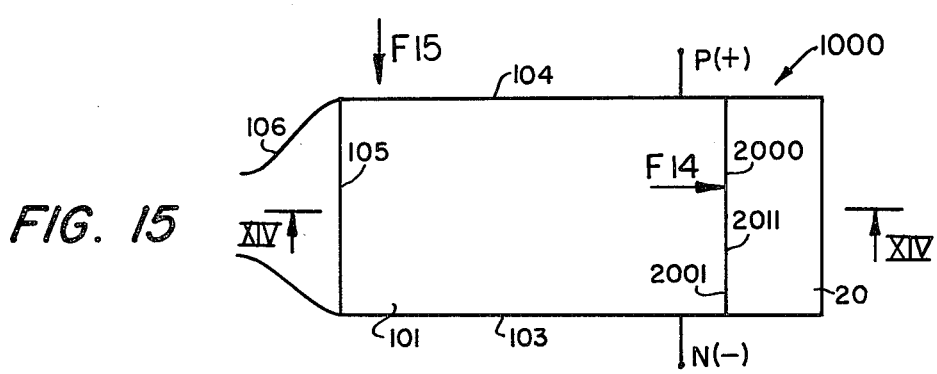
FIG. 15 is a diagrammatic view, of the generator shown in FIG. 14, the view being in section along the line XV—XV of FIG. 14 and in a plane parallel to the main faces of the chambers.

FIGS. 14 and 15 show another generator 1000 comprising five chambers marked 10-1, 10-2, 10-3, 10-4, 10-5; each of these chambers has two main faces 101 and 102 and two side faces 103 and 104. These chambers are arranged successively in order, one alongside of the other, the main face 101 of a chamber being the main face of the chamber closest to the main face 102 of the following chamber and parallel to the face 102.

Figure 2:
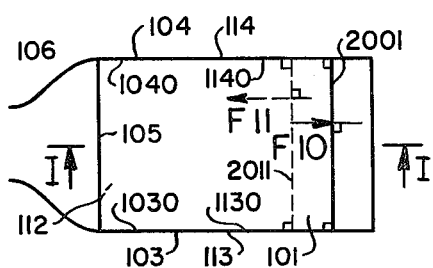
FIG. 2 is a diagrammatic view, seen from above, of the generator shown in FIG. 1, in section along the line II—II of FIG. 1 and in a plane parallel to the lower face of the upper chamber.

The chamber 10-1 is identical to the chamber 10 shown in FIGS. 1 and 2 and described above, the opening 105 of the chamber 10-1 being connected to the feed device 106. The chamber 10-1 is connected to the chamber 10-2 by a connecting conduit 20 identical to the conduit 20 previously described and shown in FIGS. 1 and 2, the angles $\alpha_0$ and $\alpha_1$ being equal to 90° that is to say the rectangular face 2000 of this conduit 20 is perpendicular to the main faces 101 and 102 of the chambers 10-1 and 10-2, respectively. The chamber 10-2 is identical to the chamber 10-1, with the difference that the end 105 of the chamber 10-2, namely the end opposite the conduit 20, is formed of a rectangular end face perpendicular to the main faces 101 and 102 and to the side faces 103 and 104 of the chamber 10-2. The chamber 10-2 is connected to the chamber 10-3 by a connecting conduit 20 identical to the conduit 20 connecting the chambers 10-1 and 10-2, and arranged at the other end of the chamber 10-2.

The chambers 10-3 to 10-5 are identical to the chamber 10-2 and are connected to each other by conduits 20 in the same manner as the chambers 10-1 and 10-2.

In each chamber 10-2 to 10-5, there is arranged an electron collector 1011 in the form, for instance, of a generally flat grid parallel to the main faces 101 and 102 of the chamber, called the compartment, and at the same distance from these faces. This arrangement is not limitative, and the collector 1011 can, for instance, be a plate arranged between the faces 101 and 102. The main faces 101 and 102 of the chambers 10-1 to 10-5 have, for instance, a substantially vertical orientation. The electrolyte 21 containing the particles 22 is introduced into the chamber 10-1 via the device 106, and the flow of the electrolyte 21 and particles 22 takes place in the five chambers thus connected in series by the conduits 20.

The particles 22 may be solid particles, liquid or pasty drops, or gas bubbles, or mixtures of such particles.

The streamlines of the flow in the vicinity of each of the edges 2001 and 2011 of each connecting conduit 20 have a direction which is substantially perpendicular to said edge, each edge 2001 being adjacent a main face 101, and each edge 2011 being adjacent a main face 102.

The arrow F14 diagrammatically represents such a streamline in FIG. 15. The average direction of flow in each of the chambers 10-1 to 10-5 is parallel to the arrows F10-1 to F10-5 respectively, said arrows being for instance vertical. The chambers 10-1 to 10-5 preferably have a so-called "head-tail" arrangement, as shown in FIG. 14, that is to say the arrows F10-1 to F10-5 have alternately opposite directions from one chamber to the next.

The conduit 20 leading onto the face 101 of the chamber 10-5 serves as evacuation conduit for the generator 1000. Preferably, the collectors 1011 do not extend into the portions of the chambers which lie in extensions of the conduits 20. The flow is thus facilitated, and the collectors 1011 are then fastened to at least one of the side faces 103, 104 of the corresponding chamber.

The particles 22 are distributed practically homogeneously, that is to say without sedimentation, throughout the entire electrolyte 21 during their passage in the compartments 10-2 to 10-5, the electrolyte filling up practically the entire free space of said compartments, which assures numerous and repeated contacts between the particles 22 and the collectors 1011 and therefore good electrochemical operation of the compartments 10-2 to 10-5. For clarity in the drawing, the particles 22 have not been shown in chambers 10-1 to 10-5. The density of the particles 22 used in the generator 1000 may be greater than, equal to, or less than that of the electrolyte 21.

As previously indicated, the particles 22 may, for instance, consist in whole or in part of an anode active metal, for instance zinc, the collectors 1011 being thus anode collectors, each connected to a negative terminal N. Each of the cathode compartments 19, arranged each between two successive anode compartments 10-2 to 10-5, has at least one cathode 190 with a cathode collector 1900 connected to a positive terminal P.

For clarity in the drawing only one positive terminal P and one negative terminal N have been shown in FIG. 15.

The cathode 190 is, for instance, an air or oxygen diffusion electrode similar to the cathode 130 previously described and shown in FIG. 9, the circulation of air or oxygen taking place, for instance, perpendicularly to the extensions of the side faces 103 and 104, parallel to the arrow F 15 (FIG. 15).

The ion exchanges between each anode compartment 10-2 to 10-5 and the adjacent cathode or cathodes 190 which are electrochemically associated with it can be effected by at least one of the main faces 101, 102 of this anode compartment, such face being, for instance, provided with a hydrophilic separator which is permeable to the electrolyte 21, for instance an alkaline aqueous electrolyte, and impermeable to the particles 22, the separator being possibly formed of a part of the corresponding cathode 190. It goes without saying that the space 19-1 between the chambers 10-1 and 10-2 may possibly contain a cathode connected electrically to a positive terminal P, as well as the space 19-2 adjacent to the face 101 of the chamber 10-5.

When the ion exchanges can take place in an anode compartment via its faces 101 and 102, the compartment is electrochemically associated with two cathodes 190, which increases the power of the generator 1000, these two cathodes being, for instance, electrically connected to the same positive terminal P. For this purpose, each cathode compartment 19 arranged between two successive anode compartments may comprise, for instance, two cathodes 190 between which the circulation of air or oxygen can take place, as shown in FIG. 14. It goes without saying that each compartment 10-2 to 10-5 may possibly comprise at least one additional anode collector (not shown) which, for instance, is in the form of a grid or a perforated plate applied against one of the main faces 101, 102, this grid or perforated plate, which is permeable to electrolyte, being either permeable or impermeable to the particles 22. When such a grid or perforated plate is impermeable to the particles 22, it can possibly itself constitute a separator, at least in part.

Such an additional anode collector can, for instance, be applied against each of the main faces 101, 102 of at least one of the compartments 10-2 to 10-5 in order further to increase the electron exchanges.

The anode collectors of the same anode compartment are, for instance, connected electrically to the same negative terminal N. The terminals P and N previously described permit electrical connections in series and/or in parallel in the generator 1000 and/or with other generators (not shown).

The electrolyte 21 and the particles 22 coming from the chamber 10-5 are, for instance, recycled to the device 106 through the path 193 in which there are located, in series, a pump 194 and a buffer reservoir 195 containing electrolyte 21 and particles 22.

The feed device 106 is, for instance, a simple conduit or one of the devices described in the aforementioned U.S. patent application Ser. No. 821,759. The object of the chamber 10-1 is to permit a homogenizing of the particles 22 throughout the entire mass of the electrolyte 21 before passage into the chamber 10-2, the chamber 10-1 thus serving as feed device for the compartment 10-2, but it can also be provided with a collector.

It goes without daying that all the arrangements described above for the sedimentation-bed generators can possibly be used in a generator without sedimentation, of the type of generator 1000. Thus, for instance, one can have the following arrangements in at least one of the chambers of such a generator:

the edge of the connection conduit may be perpendicular to the side connecting lines or to the end connecting lines of the main face adjacent to the edge, the edge being formed, for instance, of at least one linear line and/or of a circular arc;

the edge of the conduit may be formed of a circle;

the side faces may diverge in the direction of flow, the upstream chamber possibly having a plurality of pairs of divergent side faces;

the side faces and/or at least one end face may have the shape of a portion of a cylinder or torus, the concavity of such shape facing the electrolyte.

Of course, the invention is not limited to the embodiments described above, on the basis of which one can contemplate other methods and embodiments without thereby going beyond the scope of the invention.

In particular, the invention extends, for instance, to cells each containing a plurality of chambers in each of which an electrolyte containing particles flows, and to generators whose electrolyte and particle recirculation devices comprise devices for treating the electrolyte and/or particles, particularly electrolytic or chemical regenerating devices.

Accordingly, the invention is as broad as the following claims and their equivalents.

I claim:

1. A method of producing electric current utilizing electrochemical reactions in a generator comprising at least two chambers and a connecting conduit connecting the two chambers in series so that one of the chambers is upstream and the other downstream of the conduit, each of the two chambers comprising two main faces, said method comprising the steps of creating, through the two chambers, a flow in series of a liquid electrolyte which contains a plurality of particles, at least one of the two chambers constituting a compartment comprising at least one electron collector, characterized in that the flow passes from the upstream chamber to the downstream chamber via the connecting conduit, the connecting conduit being formed with two openings which respectively debouch on the closest main faces of the two chambers, each opening being limited by an edge on the side of the adjacent main face, so that the streamlines of the flow in the vicinity of each of these edges are oriented substantially at right angles to said respective edges.

2. A method of producing electric current according to claim 1, wherein the particles are at least partially active.

3. A method of producing electric current according to claim 1, wherein the particles transport at least one active material.

4. A method of producing electric current according to claim 1, wherein the particles are solid and constitute a sedimentation bed which is entrained by the electrolyte within at least one chamber.

5. A method of producing electric current according to claim 1, wherein the particles are distributed substantially homogeneously throughout the entire mass of electrolyte within at least one chamber.

6. An electrochemical generator of electric current comprising at least two chambers, and a connecting conduit connecting the two chambers in series, each of the two chambers comprising two main faces and two sides faces connected by at least one end face, the side faces being connected to the main faces by side connecting lines, the end face being connected to the main faces by end connecting lines, the generator comprising means for creating, through the two chambers, a flow in series of a liquid electrolyte which contains a plurality of particles, at least one of the two chambers constituting a compartment comprising at least one electron collector, characterized in that the connecting conduit is formed with two openings which respectively debouch on the closest main faces of the two chambers, each opening being limited by an edge on the side of the adjacent main face so that the streamlines of the flow in the vicinity of each of these edges are oriented substantially at right angles to said respective edges.

7. An electrochemical generator according to claim 6, wherein at least one edge is perpendicular to at least one of the connecting lines of the main face adjacent to said edge.

8. An electrochemical generator according to claim 7, wherein the edge is formed of at least one linear line.

9. An electrochemical generator according to claim 7, wherein the edge is formed of at least one circular arc.

10. An electrochemical generator according to claim 6, wherein at least one edge is a circle spaced from the side and end faces and near said end face.

11. An electrochemical generator according to claim 6, wherein at least one edge is a circle spaced from the side faces and tangent to the end connecting line of the main face adjacent to said edge, said end line corresponding to a curved end face, the concavity of said end face facing the electrolyte.

12. An electrochemical generator according to claim 6, formed with a plane of symmetry parallel to the average direction of flow in each of the two chambers and perpendicular to the main faces of said chambers.

13. An electrochemical generator according to claim 6, wherein the main faces of at least one of the chambers are substantially flat.

14. An electrochemical generator according to claim 6, wherein the main faces of at least one of the chambers are substantially parallel.

15. An electrochemical generator according to claim 6, wherein the opposite side faces of at least one chamber form with each other an angle diverging in the direction of flow.

16. An electrochemical generator according to claim 6, wherein the side faces of at least one chamber have a flat shape and are perpendicular to the main faces.

17. An electrochemical generator according to claim 6, wherein the end face of at least one chamber has a flat shape and is perpendicular to the main faces.

18. An electrochemical generator according to claim 6, wherein the side faces of at least one chamber have the shape of a portion of a cylinder whose concavity faces the electrolyte.

19. An electrochemical generator according to claim 6, wherein the end face of at least one chamber has the shape of a portion of a cylinder whose concavity faces the electrolyte and is perpendicular to the main faces.

20. An electrochemical generator according to claim 6, wherein the side faces of at least one chamber have semi-cylindrical shapes, the concavity of these shapes facing the electrolyte.

21. An electrochemical generator according to claim 6, wherein the end face of at least one chamber has a semi-cylindrical shape, the concavity of this shape facing the electrolyte.

22. An electrochemical generator according to claim 6, wherein the side faces of at least one chamber have semi-toroidal shapes, the concavity of these shapes facing the electrolyte.

23. An electrochemical generator according to claim 6, wherein the end face of at least one chamber has a semi-toroidal shape, the concavity of this shape facing the electrolyte.

24. An electrochemical generator according to claim 6, wherein, at least within one chamber, the main faces are each formed of a rectangle extended on two opposite sides by two semi-circular surfaces, the linear sides of these faces being connected by two sides faces, and the curved edges of the semi-circular surfaces being connected by two end faces.

25. An electrochemical generator according to claim 6, wherein the two chambers are in head-tail relation, the average directions of flow in these chambers being reversed with respect to each other.

26. An electrochemical generator according to claim 6, wherein the particles are solid and constitute, at least within the compartment, a sediment bed which is entrained by the electrolyte.

27. An electrochemical generator according to claim 6, wherein the particles are distributed, at least within the compartment, substantially homogeneously throughout the entire mass of the electrolyte, the collector being arranged between the main faces of the compartment.

28. An electrochemical generator according to claim 27, wherein the compartment comprises at least one other collector said other collector being permeable to the electrolyte and applied against one of the main faces.

29. An electrochemical generator according to claim 27, wherein the compartment comprises at least one other collector, said other collector being permeable to the electrolyte and constituting at least part of one of the main faces.

30. An electrochemical generator according to claim 6, wherein the compartment is an anode compartment, the particles are formed at least partly of an anode active metal, and the anode compartment is in ionic connection by at least one main face with at least one cathode compartment comprising at least one cathode with an active material.

31. An electrochemical generator according to claim 30, wherein the anode active metal is zinc, the cathode active material includes oxygen, and the electrolyte is an alkaline aqueous electrolyte.

32. An electrochemical generator according to claim 6, wherein the particles are at least partially active.

33. An electrochemical generator according to claim 6, wherein the particles transport at least one active material.

* * * * *

UNITED STATES PATENT OFFICE
CERTIFICATE OF CORRECTION

Patent No. 4,133,940  Dated January 9, 1979

Inventor(s) Pierre Durand

It is certified that error appears in the above-identified patent and that said Letters Patent are hereby corrected as shown below:

First page, Item 30, "Aug. 8, 1976" should read --Aug. 6, 1976-- and "76 22331" should read --77 22331--; Col. 2, line 31, "with" should read --which--; Col. 3, lines 20, 27 and 28, "poiseville" should read --poiseuille--; Col. 3, line 51, "disturbance" should read --disturbances--; Col. 4, line 33, "force" should read --face--; Col. 4, line 34, "diagrammtic" should read --diagrammatic--; Col. 5, line 35, after "generator" insert --1--; Col. 6, line 31, "particles 20" should read --particles 22--; Col. 7, line 48, "edges" should read --edge--; Col. 7, line 65, "D6/2,," should read --D6/2,--; Col. 8, line 46, delete "show another"; Col. 9, line 56, "12," should read --12.--; Col. 10, line 13, "sedimentation.beds" should read --sedimentation beds--; Col. 10, line 23, "Fig. 9. the" should read --Fig. 9. The--; Col. 10, line 31, "insdie" should read --inside--; Col. 10, line 64, "useful." should read --useful,--; Col. 11, line 7, "such an arrngment" should read --Such an arrangement--; Col. 11, line 14, "arrangment" should read --arrangement--; Col. 11, line 19, "applications" should read --application Ser. No. 821,759--;

UNITED STATES PATENT OFFICE
CERTIFICATE OF CORRECTION

Patent No. 4,133,940      Dated January 9, 1979

Inventor(s) Pierre Durand

It is certified that error appears in the above-identified patent and that said Letters Patent are hereby corrected as shown below:

Col. 11, line 24, "then" should read --than--; Col. 11, line 29, "compartmwent" should read --compartment--; Col. 12, line 8, "anoidic" should read --anodic-- and "part of" should read --part or--; Col. 12, line 63, after "cathode" insert --the--; Col. 12, line 66, "obained" should read --obtained--; Col. 12, line 67, "paticles" should read --particles--; Col. 12, last line, to Col. 13, first line, "predetermined" should read --to--; Col. 13, line 15, "continually" should read --continuously--; Col. 13, line 38, "the" should read --The--; Col. 15, line 63, "daying" should read --saying--; Col. 16, line 1, "connection" should read --connecting--; Col. 18, line 19, "Two sides faces" should read --two side faces--; Col. 18, line 38, after "collector" (first occurrence), insert a comma.

Signed and Sealed this

Twenty-sixth Day of June 1979

[SEAL]

Attest:

RUTH C. MASON
Attesting Officer

DONALD W. BANNER
Commissioner of Patents and Trademarks